United States Patent [19]

Taneya et al.

[11] Patent Number: 5,448,548
[45] Date of Patent: Sep. 5, 1995

[54] OPTICAL INFORMATION READING METHOD FOR REDUCING LASER NOISE USING A SEMICONDUCTOR LASER AND A DRIVING DEVICE FOR THE SEMICONDUCTOR LASER

[75] Inventors: Mototaka Taneya, Nara; Tatsuya Morioka, Tenri; Atsushi Shimonaka, Nara, all of Japan

[73] Assignee: Sharp Kabushiki Kaisha, Osaka, Japan

[21] Appl. No.: 140,748

[22] Filed: Oct. 21, 1993

[30] Foreign Application Priority Data

Oct. 21, 1992 [JP] Japan .................................. 4-283298

[51] Int. Cl.⁶ ............................................. G11B 7/125
[52] U.S. Cl. .................................... 369/121; 369/116; 369/54; 372/26
[58] Field of Search ............... 369/121, 116, 107, 110, 369/112, 122, 44.32; 365/54, 53, 50; 372/20, 26, 33, 43

[56] References Cited

U.S. PATENT DOCUMENTS 5,313,448  5/1994  Sukeda et al. .................... 369/121

OTHER PUBLICATIONS

M. Morimura et al., *Optronics*, No. 6 (Jun.), pp. 60–66, 1991, "Semiconductor Devices for Photonic Measurement Use".
H. Nishihara, *Applied Physics*, vol. 61, No. 1, pp. 2–13, 1992, "Integrated-optic Techniques Using Diffraction Gratings".
S. Matsui et al., *Applied Optics*, vol. 23, No. 22, pp. 4001–4006, 1984, "Low Noise Characteristics of V-channeled Substrate Inner Stripe Laser in Single-longitudinal-mode Operation".
T. Kobayashi et al., *Shingakugihou OQE 87-153*, pp. 65–71, 1987, "FM Heterodyne Measurement of Distance Using a Semiconductor laser".

Primary Examiner—Georgia Y. Epps
Assistant Examiner—Muhammad N. Edun
Attorney, Agent, or Firm—Morrison & Foerster

[57] ABSTRACT

A method for optically reading recorded information by radiating laser light emitted from a semiconductor laser which oscillates in a single longitudinal mode to an information recording medium and by detecting laser light reflected from a recording face of the information recording medium is disclosed. In the method, the optical frequency of the laser light is modulated in order that the modulated optical frequency is a periodic function dependent on time, and the absolute value of a time differential coefficient R (Hz/s) of the periodic function, a spectral line width $\delta \nu$ (Hz) of the laser light, and a time period $\tau$ (s) from the time when the laser light is emitted to the time when the laser light reflected from the recording face of the information recording medium reaches the semiconductor laser satisfy the condition of $R \geq \delta \nu / \tau$. The periodic function varies to have a sawtooth waveform or a triangular waveform.

18 Claims, 5 Drawing Sheets

ABOUT 1.5 THz

FIG. 8

OPTICAL INFORMATION READING METHOD FOR REDUCING LASER NOISE USING A SEMICONDUCTOR LASER AND A DRIVING DEVICE FOR THE SEMICONDUCTOR LASER

BACKGROUND OF THE INVENTION

1. Field of the Invention

The present invention relates to a reading method for an optical memory, and more particularly to a semiconductor laser driving method for suppressing a laser noise when optical information is read out.

2. Description of the Related Art

An optical memory which is an information recording medium such as a compact disk (CD) or a magneto-optical disk has a large recording capacity and a capability of high-speed access. Due to the above advantages, the optical memory is currently used as a recording device for various information equipments such as a personal computer or a word processor.

The information recorded on the information recording face of the optical memory is read out by using an optical unit which is generally referred to as an optical pickup. The information is read out by the optical pickup in the following manner. Laser light is emitted from a semiconductor laser which serves as a light source. The laser light is reflected by the information recording face while the intensity of the reflected laser light is modulated depending on the information recorded on the information recording face of the optical memory. The intensity of the reflected light is detected by a photoreceiving device which is provided in the optical pickup.

In the optical pickup having such a construction, the semiconductor laser is located at the side of the photoreceiving device. Accordingly, part of the laser light reflected from the information recording face of the optical memory returns to the semiconductor laser. Such part of laser light which returns to the laser resonator of the semiconductor laser is generally referred to as "feedback light". The feedback light may cause an optical intensity noise in the semiconductor laser.

The noise caused by the feedback light is generated due to the lightwave interference effect (hereinafter referred to as the interference effect) of the oscillating laser light and the feedback light in the inside of the semiconductor laser. More specifically, the feedback light disturbs the phase of the oscillating laser light in the inside of the semiconductor laser resonator at random, so that the optical output intensity of the laser light is slightly changed. Thus, an optical intensity noise is generated. That is, the laser light emitted from the semiconductor laser maintains the coherent condition (the coherent length of the semiconductor laser is 10–50 m), while the laser light travels to be reflected from the information recording face of the optical memory and returns to the semiconductor laser (the traveling distance is 30–100 mm). Thus, there occurs the interference of the oscillating laser light and the feedback light, so that a noise is generated. In general, the level of the noise increases, as the coherence of the laser light increases.

The noise caused by the feedback light (hereinafter referred to as the feedback light noise) deteriorates the carrier to noise ratio (the C/N ratio) of the system when the information recorded on the information recording face of the optical memory is to be read out. Therefore, the feedback light noise is a critical problem for the various systems such as a high-density magneto-optical disk system in which the intensity of signal light is low, an analog-recording laser disk system on which image information requiring a high S/N ratio is recorded, an optical memory reading apparatus which applies a micro optical pickup in which the amount of the feedback light to the semiconductor laser is large.

As one means for solving the above problem, the use of an optical isolator is considered. However, in the optical memory system field, there exist strong desires that the system price be suppressed to be low, and that the optical pickup is made smaller in size and weight. With these desires, it is not preferable to additionally provide an optical device such as an optical isolator, because such provision increases the price, the size and the weight of the resulting system.

As mentioned above, the feedback light noise is caused by the coherence of the semiconductor laser. Accordingly, in order to suppress the feedback light noise, it is effective to shorten the coherent length of the semiconductor laser. For such a purpose, an optical pickup of an optical memory device conventionally adopts a technique referred to as a high frequency superimposition method for modulating the intensity of the output laser light from the semiconductor laser at a high frequency, or a technique referred to as a self-oscillation laser method for naturally providing, in addition, a function of modulating the intensity of the output laser light.

Figure 7:
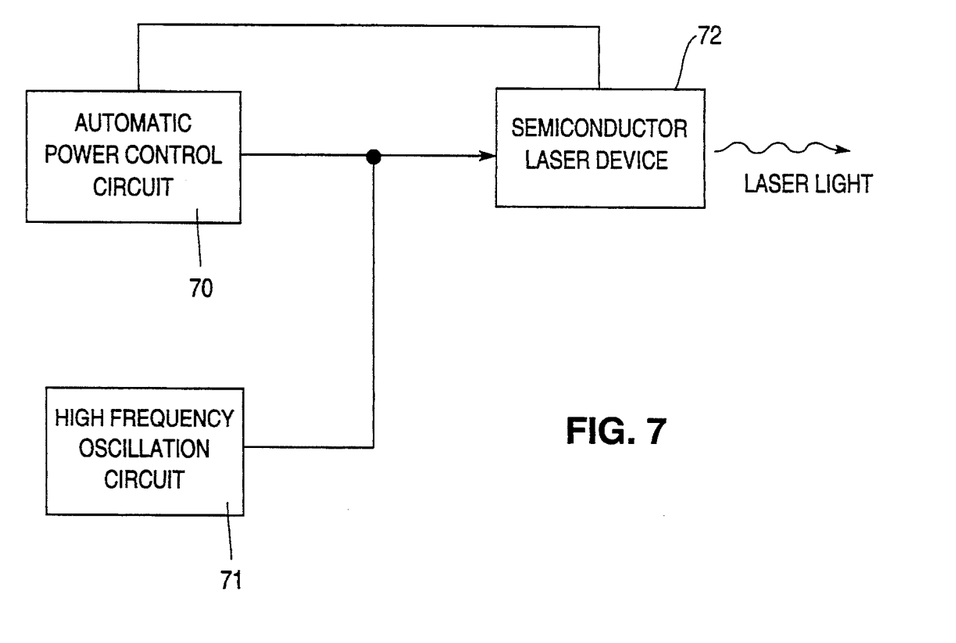
FIG. 7 is a block diagram showing a conventional semiconductor laser driving circuit using a high frequency superimposition method.

FIG. 7 shows a semiconductor laser driving circuit which adopts the high frequency superimposition method. The semiconductor laser driving circuit includes an automatic power control circuit 70, a high frequency oscillation circuit 71, and a semiconductor laser device 72. According to a general method for driving a semiconductor laser device, the automatic power control circuit is directly coupled with the semiconductor laser device. Thus, the semiconductor laser device is driven by a DC current supplied from the automatic power control circuit. According to the high frequency superimposition method, the semiconductor laser device 72 is driven by a current which is obtained by superimposing a high frequency current from the high frequency oscillation circuit 71 on the DC current from the automatic power control circuit 70.

In the case where the semiconductor laser device 72 is driven by the current including such high frequency components, the frequency of the output laser light is modulated due to the non-linear effect inherent in the semiconductor laser device 72. Note that the frequency of light is greatly higher than the frequency of a usual electric signal. However, it is possible to treat, as the electric signal, a light signal spectrum the frequency of which is modulated by a signal having a certain frequency component, and side bands are formed on both the sides of the carrier. Accordingly, the signal spectrum is widened as compared with the spectrum of the output laser light from the semiconductor laser device driven by the DC current. This means that the coherence of the output laser light of the semiconductor laser device 72 is reduced.

It is preferable to set the frequency of the high frequency current which is superimposed on the DC current for driving the semiconductor laser device 72 so as to have a value sufficiently larger than the frequency band (1–5 MHz) of the reproduction signal of the recorded information. In general, the frequency is selected to have a value in the range of 50 to 500 MHz. As a result, the widths of the respective longitudinal mode spectra of the semiconductor laser device 72 which is driven by the current in which the signal having such a frequency is superimposed on the DC current are 10 GHz or higher. The coherent length of the laser light in this case is in the range of 1 mm to about 10 mm, which is remarkably lower than the value (10–50 m) in the case of the general DC current driving method. In the semiconductor laser device 72 having the coherent length in the range of 1 mm to about 10 mm, even if the feedback light which returns to the semiconductor laser device 72 with a traveling distance of 30–100 mm reaches the inside of the laser resonator, the feedback light neither interferes with the oscillating laser light in the laser resonator, nor causes a feedback light noise.

On the other hand, according to the self-oscillation laser method, one semiconductor laser has, in addition, the same effect as that attained by the above high frequency superimposition method. In this case, the high frequency oscillation 71 is realized in the inside of the laser resonator as the fluctuation of the carrier in the semiconductor laser device 72. Therefore, it is not necessary to additionally provide a high frequency oscillation circuit.

On the other hand, by the high frequency superimposition method, it is necessary to provide the high frequency oscillation circuit 71. Thus, this case has a drawback that the driving circuit for the semiconductor laser device 72 is expensive.

The self-oscillation laser method has an advantage that it is unnecessary to additionally provide a high frequency oscillation circuit. However, the acceptable design conditions for a semiconductor laser device having the effect of the high frequency oscillation by the fluctuation of the carrier are seriously limited. Therefore, the semiconductor laser device is likely to be adversely affected by the variation in the process conditions during the fabrication of the semiconductor laser device, and thus the actually fabricated semiconductor laser device may have values which are slightly varied from the design values. This leads to a drawback that the yield thereof decreases.

Figure 8:
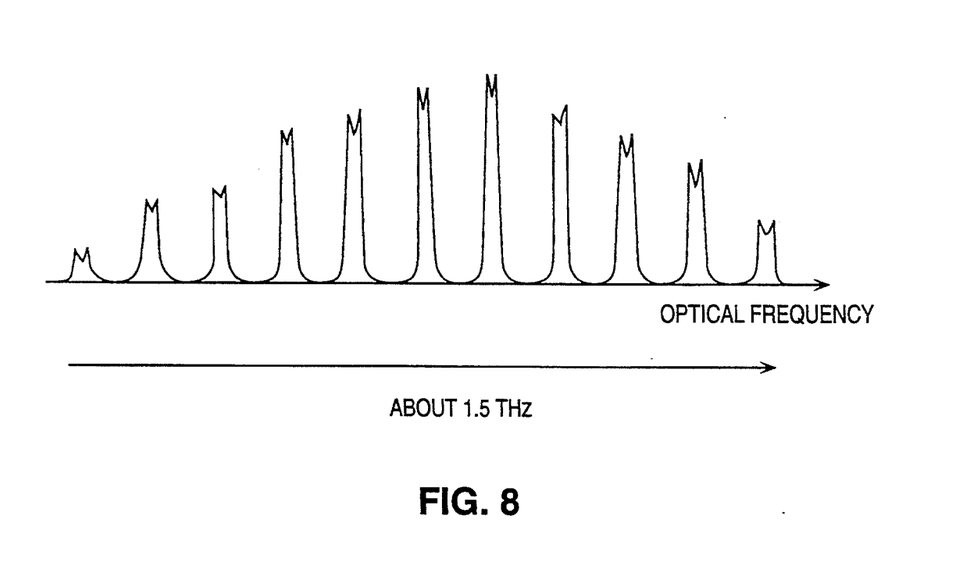
FIG. 8 shows a time-averaged spectrum of the output laser light for explaining the drawbacks of prior art.

Further, the high frequency superimposition method and the self-oscillation laser device have the same problem as follows. In both the methods, the frequency of the output laser light from the semiconductor laser device is modulated by the current including the high frequency components. In these case, the axial mode (spectrum) of the output laser light is generally a multi mode as shown in FIG. 8. In other words, the spectrum has a plurality of peaks, so that the total spectral width is widened to be about 3 nm in wavelength (i.e., 1.5 THz in optical frequency).

Therefore, in addition to the deterioration in the coherent length, the monochromaticity of the output laser light is deteriorated more than necessary. Such deterioration in the monochromaticity of the laser light constitutes a problem when the semiconductor laser device is applied to an optical pickup including a condensing or polarizing optical system which utilizes a diffraction phenomenon of light such as a hologram, a grating, or the like which is recently used in this field. This is because the light control function by the hologram or the grating largely depends on the employed laser light wavelength, and because the monochromaticity of 1 nm or less is generally required.

SUMMARY OF THE INVENTION

According to the invention, a method for optically reading recorded information by radiating laser light emitted from a semiconductor laser which oscillates in a single longitudinal mode to an information recording medium and by detecting laser light reflected from a recording face of the information recording medium is provided. In the method, the optical frequency of the laser light is modulated in order that the modulated optical frequency is a periodic function dependent on time, and the absolute value of a time differential coefficient R (Hz/s) of the periodic function, a spectral line width $\delta \nu$(Hz) of the laser light, and a time period $\tau$(s) from the time when the laser light is emitted to the time when the laser light reflected from the recording face of the information recording medium reaches the semiconductor laser satisfy the condition of $R \geq \delta \nu / \tau$.

In one embodiment of the invention, the periodic function varies to have a sawtooth waveform.

In another embodiment of the invention, the periodic function varies to have a triangular waveform.

According to the condition of Expression (1) (the driving condition), the feedback light noise can be suppressed for the following reasons.

$$R \geq \delta \nu/\tau \qquad (1)$$

If the wavelength of the output laser light, i.e., the optical frequency is modulated to have a periodic sawtooth waveform, laser light with a constant output level and with an optical frequency which periodically varies can be obtained. The rate of change with respect to time (the absolute value of the time differential coefficient) R (Hz/s) of optical frequency is represented by Expression (2):

$$R = f/T \qquad (2)$$

where f denotes an optical frequency modulation width, and T denotes the modulation period in this case.

The difference $\Delta$ between the optical frequency of the oscillating laser light and the optical frequency of the feedback light at the time when the feedback light reaches the semiconductor laser is represented by Expression (3).

$$\Delta = R \cdot \tau \qquad (3)$$

As described above in the description of the prior art, the feedback light noise is caused due to the interference effect by the feedback laser light and the oscillating laser light. Thus, it is possible to minimize the interference effect when the optical frequencies of the feedback laser light and the oscillating laser light, i.e., the wavelengths thereof are different from each other. In general, the degree of the interference effect by two laser beams depends on the spectral line widths of the respective laser beams. When the optical frequency difference is larger than the spectral line width, there arises no interference by the laser beams.

In this case, the spectral line width $\delta \nu$ of the output laser light from the semiconductor laser usually used for an optical memory reading apparatus is about 10–50 MHz.

Therefore, if the difference $\Delta$ between the optical frequencies of the laser beams is set to be equal to or larger than the spectral line width $\delta \nu$, the feedback light noise can be suppressed. In other words, if the difference Δ is set so as to satisfy the condition of Expression (4), the feedback light noise can be suppressed.

$$\delta\nu \geq \Delta \tag{4}$$

When Expression (3) is substituted in Expression (4) for deleting Δ, the condition of Expression (1) is derived. That is, if the condition of Expression (1) is set as the driving condition, the feedback light noise can surely be suppressed.

Thus, the present invention described herein makes possible the advantage of providing a semiconductor laser driving method for reading information from an optical memory, which improves the yield of an optical memory reading apparatus and which can greatly suppress a noise caused by feedback light while the monochromaticity of laser light is maintained.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples.

EXAMPLE 1

Figure 1:
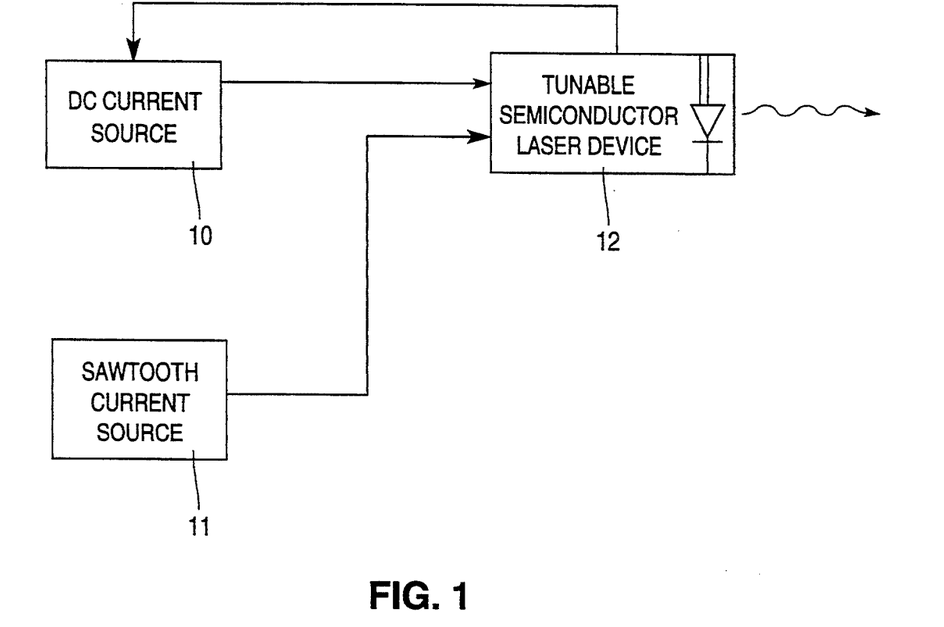
FIG. 1 is a block diagram showing a semiconductor laser driving circuit using a reading method of Example 1 according to the invention.

FIG. 1 shows a semiconductor laser driving circuit using a method for reading information from an optical memory of a first example according to the invention. The semiconductor laser driving circuit includes a DC current source 10 containing an automatic power control (APC) circuit, a sawtooth current source 11, and a tunable semiconductor laser device 12 containing a photoreceiving device for monitoring an optical output. To the laser light power control terminal of the tunable semiconductor laser device 12, a DC current is input from the DC current source 10. To the laser wavelength control terminal, i.e., to the optical frequency control terminal of the tunable semiconductor laser device 12, an optical frequency modulation signal is input from the sawtooth current source 11.

The operation of the semiconductor laser driving circuit having the above construction will be described below. The power of the output laser light from the tunable semiconductor laser device 12 is detected by the photoreceiving device for monitoring the optical output which is contained in the tunable semiconductor laser device 12. The detected signal from the photoreceiving device is supplied to the DC current source 10 as a feedback signal. Then, the APC circuit contained in the DC current source 10 controls the output level of the DC current source 10, so that the output current of the photoreceiving device is maintained to be a fixed value, whereby the output level of the laser light is kept constant.

Figure 2:
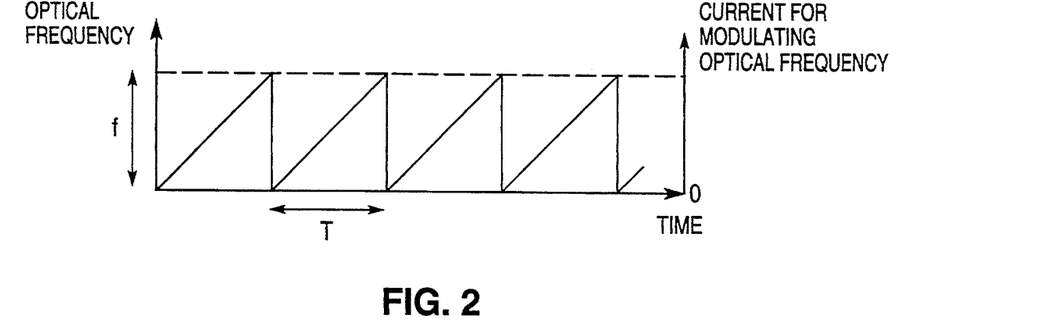
FIG. 2 shows a waveform of an optical frequency modulation pattern of the output laser light of a tunable semiconductor laser device used in Example 1

At this stage, to the laser wavelength (or optical frequency) control terminal of the tunable semiconductor laser device 12, the optical frequency modulation signal is input from the sawtooth current source 11. As a result, the optical frequency of the output laser light is modulated to have a periodic sawtooth waveform as shown in FIG. 2. Thus, laser light with a constant output level and with an optical frequency which periodically varies can be obtained.

The laser light output from the tunable semiconductor laser device 12 is converged on the information recording face of the optical memory (not shown), and reflected therefrom. The reflected light from the information recording face returns to the emitting face of the tunable semiconductor laser device 12.

In Example 1, as shown in FIG. 2, the sawtooth current having the waveform with an amplitude of f, and an modulation period of T was used. It is noted that the amplitude f of the sawtooth current corresponds to the modulation width of the optical frequency of the output laser light. Thus, the rate of change with respect to time R (Hz/s) of the optical frequency is represented by Expression (2).

$$R = f/T \tag{2}$$

When the time period from the time when the laser light is emitted from the tunable semiconductor laser device 12 to the time when the laser light which is reflected from the information recording face of the optical memory returns to the tunable semiconductor laser device 12 is represented by r, the difference Δ between the optical frequency of the oscillating laser light and the optical frequency of the feedback light at the time when the feedback light reaches the tunable semiconductor laser device 12 is represented by Expression (3).

$$\Delta = R \cdot \sigma \tag{3}$$

In an apparatus in which information is read out by utilizing laser light reflected from the information recording face of the optical memory, such as an optical memory reading apparatus according to the invention, it is important to suppress the feedback light noise which has been explained in the prior art. The feedback light noise is caused by the interference effect by the feedback laser light and the oscillating laser light as described above. Accordingly, in order to suppress the feedback light noise, the optical frequency of both the laser beams, i.e., the wavelengths thereof should be set to be different from each other by a predetermined value or more. According to the invention, the feedback light noise is suppressed in accordance with the basic principle.

In general, the degree of the interference effect by two laser beams depends on the difference $\Delta$ between the optical frequencies of the two laser beams, and the spectral line widths $\delta \nu$ W of the respective laser beams. When the difference $\Delta$ between the optical frequencies is larger than the each spectral line width $\delta \nu$, there causes no interference by the laser beams.

In the semiconductor laser device as a light source for the usual optical memory reading apparatus, the spectral line width $\delta \nu$ of the output laser light is about 10–50 MHz. Therefore, if the difference between the optical frequencies of the feedback light and the oscillating laser light is set to be equal to or larger than the spectral line width $\delta \nu$, the feedback light noise can be suppressed. In other words, if the relationship therebetween is set to satisfy the condition of Expression (4), the feedback light noise can be suppressed.

$$\delta \nu \leq \Delta \qquad (4)$$

When Expressions (2) and (3) are substituted in Expression (4), the condition of Expression (1) is derived. That is, if the rate of change with respect to time R (Hz/s) of the optical frequency of the tunable semiconductor laser device 12 is set to satisfy the condition of Expression (1), the feedback light noise can surely be suppressed.

$$R \geq \delta \nu/\tau \qquad (1)$$

Next, the more detailed construction of the tunable semiconductor laser device 12 and the like used in Example 1 will be described. First, as the tunable semiconductor laser device 12, a semiconductor laser device which operates based on the principle for electrically changing a refractive index in the inside of the laser resonator, in a distributed feedback laser (DFB laser) in which the wavelength is stabilized by adopting a distributed feedback structure. For example, such a semiconductor laser device is disclosed in Morimura et al., OPTRONICS, June, pp. 60–66 (1991).

Such a semiconductor laser device can vary the laser wavelength while a single longitudinal mode is maintained. In addition, the power and the wavelength of the output laser light can be independently controlled by individual electrodes.

The spectral line width $\delta \nu$ of the output laser light from the tunable semiconductor laser device 12 of such a semiconductor laser device in Example 1 may vary depending on the degree of wavelength modulation, but the maximum spectral line width $\delta \nu$ under the employed conditions was 30 MHz. In addition, in Example 1, the employed pickup for reading information from the optical memory requires the time period $\tau$ of 0.25 ns, the time period $\tau$ being from the time when the laser light was emitted from the tunable semiconductor laser device 12 and returned thereto.

Therefore, the modulation condition of the optical frequency shown in FIG. 2 is set to be $R=2.5 \times 10^{17}$ (Hz/s) so as to satisfy the condition of $R \geq 30$ MHz/0.25 ns $= 1.2 \times 10^{17}$ (Hz/s) based on Expression (1). A sawtooth current is input to the optical frequency control terminal of the tunable semiconductor laser device 12 by the sawtooth current source 11 so as to satisfy the condition. In order to realize the condition of $R=2.5 \times 10^{17}$ (Hz/s), the optical frequency modulation width f was set to be 0.5 THz (1 nm in wavelength), and the modulation frequency T was set to be 2 μs (500 KHz in modulation frequency).

According to the driving method of the semiconductor laser device of the invention which has been set so as to satisfy the conditions, it was found that, if the feedback light exists, the feedback light noise could be suppressed, and a sufficient value of C/N=51 dB could be obtained.

The sawtooth current source 11 which generates a sawtooth current of 500 KHz for realizing the above driving conditions can be readily and inexpensively realized by utilizing a usual electronic component. Since the tunable semiconductor laser device 12 is used as a semiconductor laser device, the optical output does not vary, i.e., constant, even when the optical frequency is modulated by the sawtooth current source 11. Accordingly, when the information recorded on the information recording face of the optical memory is to be read in accordance with the intensity of the reflected light, the modulated signal with an optical frequency having a sawtooth waveform will not deteriorate the C/N ratio of the optical intensity signal for reading. Therefore, the information can be read with a high accuracy.

Under the driving conditions which satisfy Expression (1), if the semiconductor laser device oscillates in a signal longitudinal mode and the spectral line width of the longitudinal mode is 10 GHz or less which is not large enough as described in the principle explanation, the feedback light noise can effectively suppressed.

Figure 3:
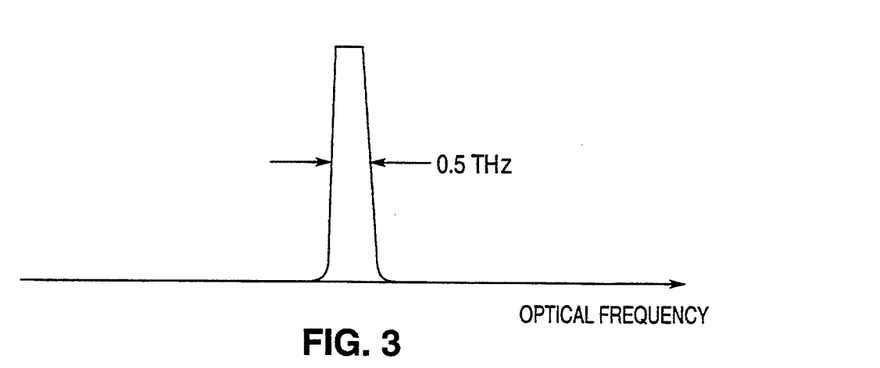
FIG. 3 shows a waveform of a time-averaged spectrum of the output laser light of the tunable semiconductor laser device used in Example 1.

In the tunable semiconductor laser device 12 which is driven by the above driving method, the single axial mode is maintained, and the time-averaged laser output spectrum is as shown in FIG. 3. In this case, the spectral line width $\delta \nu = 30$ MHz of the laser light in a certain instant is sufficiently smaller than the optical frequency modulation width f of the optical frequency shown in FIG. 2. Accordingly, the time-averaged spectral width of the laser light is equal to f=0.5 THz (1 nm in wavelength). It is understood based on the value of the time-averaged spectral width that the driving method in Example 1 can sufficiently be applied to an optical pickup which is, for example, disclosed in Nishihara, Applied Physics, Vol. 61, No. 1 (1992), pp. 2–13.

As described above, the light source for the optical memory reading apparatus in Example 1 can satisfy both the requirements, that is, the suppression of the feedback light noise, and the realization of monochromaticity of 1 nm or less.

EXAMPLE 2

Figure 4:
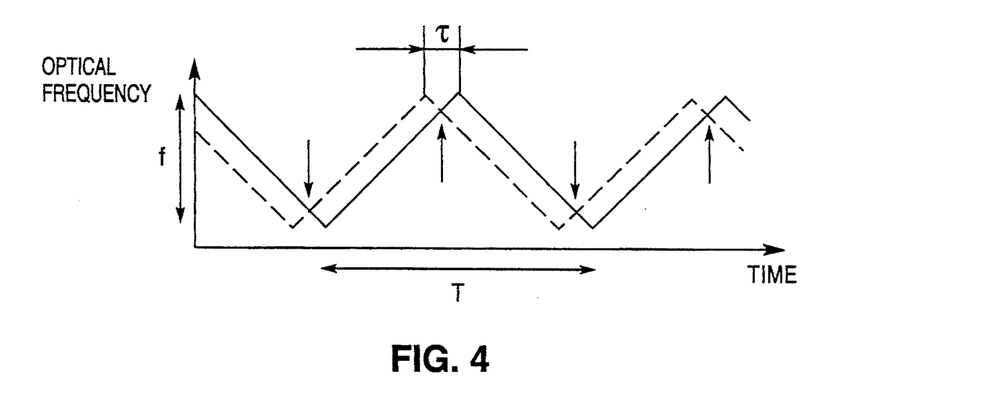
FIG. 4 shows a waveform of an optical frequency modulation pattern of the output laser light of a tunable semiconductor laser device used in Example 2 according to the invention.

FIG. 4 shows a semiconductor laser driving circuit using a method for reading information from an optical memory of a second example according to the invention. In Example 2, a triangular current source is used instead of the sawtooth current source 11. However, the actual construction of the triangular current source is the same as that of the sawtooth current source 11, and only the modulation manner is changed from the sawtooth waveform to the triangular waveform.

Specifically, to the laser wavelength (optical frequency) control terminal of the tunable semiconductor laser device 12, a triangular current shown in FIG. 4 is input from the triangular current source, whereby the tunable semiconductor laser device 12 is driven. The other construction components are the same as those in Example 1, and like reference numerals are attached to like components.

When the modulation amplitude (modulation width) and the modulation period of the optical frequency of the laser light which is modulated by the triangular current input to the control terminal of the tunable semiconductor laser device 12 from the triangular current source are represented by f and T, respectively, the rate of change with respect to time (the absolute value of the time differential coefficient) R' (Hz/s) of the optical frequency of the laser light is shown by Expression (5).

$$R' = 2f/T \qquad (5)$$

In Example 2, the modulation width f and the modulation period T are set so that R' satisfies the condition of Expression (1). Specifically, the spectral line width $\delta\nu$ of the laser light was set to be 20 MHz, and the time $\tau$ was set to be 300 ps. As a result, R', f and T were set to be $1.0 \times 10^{17}$ Hz/s, 100 GHz, and 1 μs, respectively.

In Example 2, the modulation manner of the optical frequency of the laser light is different from that in Example 1, so that the optical frequency of the feedback light shown by a broken line in FIG. 4 may instantly coincide with the optical frequency of the oscillating laser light shown by a solid line in FIG. 4. Arrows in FIG. 4 indicate the case.

When the optical frequencies of the oscillating laser light and the feedback light coincide with each other, there might be the feedback light noise due to the interference effect caused by both the laser beams.

However, according to the experimental results by the inventors, the generation of the feedback light noise was not observed, and that the C/N ratio of 49 dB which is large enough could be attained. The reason is presumed that the coincidence of the optical frequencies of two laser beams occurs in an instance, so that it is sufficiently shorter than the time period required for detecting the 1-bit information recorded on the information recording face of the optical memory.

Therefore, also in Example 2, the feedback light noise can be suppressed. In addition, it was observed that the monochromaticity was 0.2 nm or less which was sufficient.

EXAMPLE 3

Figure 5:
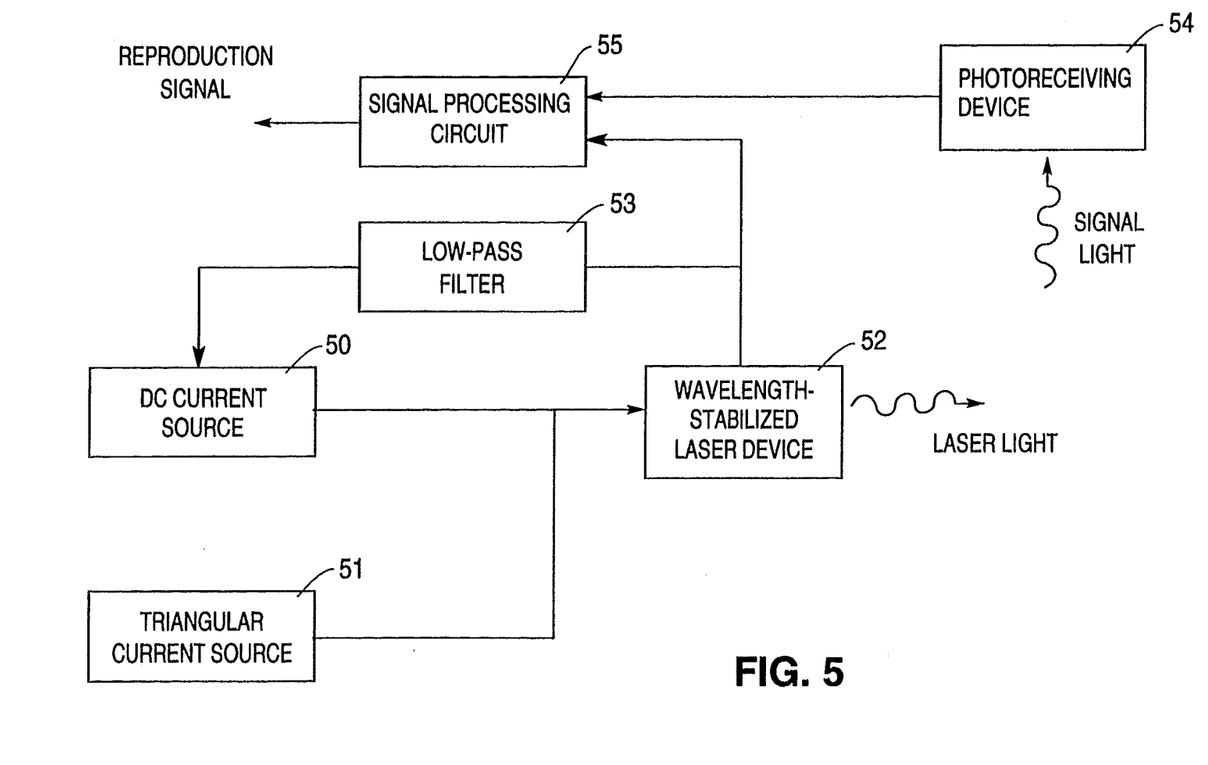
FIG. 5 is a block diagram showing a semiconductor laser driving circuit using a reading method of Example 3 according to the invention.

FIG. 5 shows a semiconductor laser driving circuit using a method for reading information from an optical memory of a third example according to the invention. In Example 3, as a semiconductor laser device, a wavelength-stabilized laser device 52 which stably emits laser light with a fixed wavelength is used. Hereinafter, such a wavelength-stabilized laser device 52 is referred to as a wavelength-stabilized laser device. To the wavelength-stabilized laser device 52, a current obtained by superimposing a triangular current from the triangular current source 51 on a DC current from the DC current source 50 is applied. In the inside of the wavelength-stabilized laser device 52, a photoreceiving device for monitoring an optical power level of the output laser light of the wave-length-stabilized laser device 52 is provided. The monitored result by the photoreceiving device is supplied to the DC current source 50 via a low-pass filter 53 as a feedback signal. Thus, the average output level of the laser light of the wavelength-stabilized laser device 52 is controlled so as to be constant.

The monitored result by the photoreceiving device is also supplied to a signal processing circuit 55 which includes comparator and the like. The signal processing circuit 55 also receives an information read signal from a photoreceiving device 54 which detects the information read signal (the reflected laser light) corresponding to the information recorded on the information recording face of the optical memory. The signal processing circuit 55 compares the information read signal with the monitored result and normalizes the information read signal, so as to output a reproduction signal.

In Example 3, as the wavelength-stabilized laser device 52, a DFB laser device is used. The DFB laser device has the oscillation wavelength of about 780 nm, and the spectral line width of 3 MHz. Such a narrow spectral line width is realized by making the length of the resonator of the DFB laser device 52 larger, i.e., to be 800 μm.

Next, the semiconductor laser driving method using the above construction will be described. The DC current source 50 produces a DC current which is controlled by the APC circuit contained in the DC current source 50 for keeping the time-averaged laser power constant. The triangular current source 51 produces an AC current having a triangular waveform. The thus produced DC current and triangular AC current are superimposed on each other, so as to be injected to the DFB laser device 52.

In semiconductor laser devices including the DFB laser device 52, the temperature in the inside of the device generally rises or lowers depending on the variation in an amount of applied current. The semiconductor material has a nature that the refractive index thereof increases as the temperature rises. Accordingly, the refractive index in the inside of the DFB laser device 52 (in the optical guiding portion) varies depending on the variation of the amount of the injected current. The oscillation wavelength of the DFB laser device 52 is determined so as to be in proportion to the product of the diffractive index pitch and the material diffractive index in the inside of the device. As a result, the wavelength of the output laser light varies in accordance with the variation of the amount of injected current.

However, since the time constant of the temperature rise in the inside of the device is 10–100 μs, the wavelength modulation phenomenon of the semiconductor laser corresponding to the amount of the injected current does not respond to the modulated current having high frequency components of 100 KHz or more.

Therefore, also in Example 3, the oscillation period of the DFB laser device 52 also temporally varies in response to the triangular AC component. That is, the variation in the optical frequency of the output laser light of the DFB laser device 52 has the same shape as that of the variation in the optical frequency in Example 2 shown in FIG. 4.

In the optical memory reading pickup which was actually employed, the time period $\tau$ was $\tau = 0.5$ ns, the time period $\tau$ being from the time when the laser light was emitted from the DFB laser device 52 to the time when the reflected light reflected from the information recording face of the optical memory returned to the DFB laser device 52. Therefore, $\delta\nu/\tau = 6 \cdot 10^{15}$ Hz.

In Example 3, as the setting parameters for driving the DFB laser device 52, the modulation period T was selected to be 10 μs (100 KHz in modulation frequency), and the amplitude of the triangular AC current was selected to be I $\Delta_{p-p} = 20$ mA (the optical frequency modulation width f = 110 GHz under the conditions).

For these setting parameters, based on Expression (2), $R = 1.1 \times 10^{16}$ Hz/s, which is larger than $\delta \nu / \tau = 6 \times 10^{15}$ Hz. That is, the condition of Expression (1) is satisfied. Therefore, in Example 3 as well as in Examples 1 and 2, the feedback light noise could be suppressed, and a good C/N ratio of 48 dB could be obtained.

However, unlike Examples 1 and 2, Example 3 adopts the method in which the DFB laser device 52 is used as a semiconductor laser, and in which, in order to modulate the optical frequency of the output laser light, the temperature of the inside of the DFB laser device 52 is varied by changing the current value injected into the DFB laser device 52. Therefore, in Example 3, it is impossible to control the optical frequency of the laser light independently of the output level of the laser light. The reason is that, according to the construction of Example 3, the output level of the laser light as well as the optical frequency of the laser light varies in accordance with the variation in the current injected into the DFB laser device 52 (that is the triangular current).

In general, as to the read of the information, the optical memory reading apparatus adopts the principle for reproducing information by detecting the intensity variation of the reflected light which varies in accordance with the information recorded on the information recording face by using the photoreceiving device 54. Therefore, the variation in the output level of the laser light of the DFB laser device 52 as a light source causes a problem in that the information cannot be accurately read out.

However, in Example 3, the modulation frequency of the triangular current injected into the DFB laser device 52 is 100 KHz which is sufficiently smaller than the information read rate of 1 MHz. Therefore, as described above, the signal processing circuit 55 compares the current value (the information read signal) detected by the photoreceiving device 54 with the current value corresponding to the output level of the laser light from the DFB laser device 52 at that time (i.e., the output monitored by the photoreceiving device contained in the DFB laser device 52). Since the information read signal is normalized by the output optical intensity, that is, the variation of the output optical intensity is canceled, the information can be read out with high accuracy. Therefore, the above problem can be eliminated in Example 3.

In addition, the DFB laser device 52 has an advantage in that, even when the modulation is performed at a high rate such as 1 GHz or more, the output laser light has the single axial mode spectrum. Therefore, even if the power and the optical frequency of the output laser light are modulated by the triangular current as in Example 3, the axial mode spectrum is single. Therefore, the time-averaged spectral line width of the laser light output from the DFB laser device 52 driven by the triangular current coincides with the optical frequency modulation width f, and it is 110 GHz in Example 3. If the value of the time-averaged spectral line width is converted into the wavelength, the wavelength is about 0.2 nm.

Therefore, since the wavelength of the above value has the sufficient monochromaticity, the semiconductor laser driving method of Example 3 can be applied to a diffractive optical element type optical pickup which applies a hologram or a grating.

EXAMPLE 4

Figure 6:
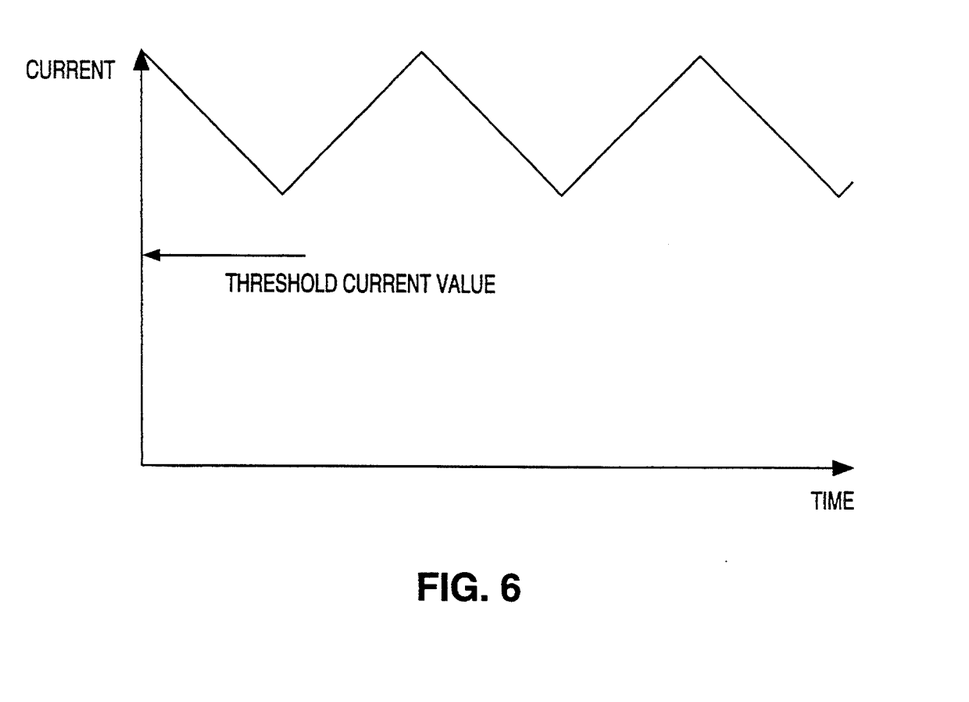
FIG. 6 shows an injected current waveform in a semiconductor laser driving circuit using a reading method of Example 4 according to the invention.

FIG. 6 shows a semiconductor laser driving circuit using a method for reading information from an optical memory of a fourth example according to the invention. In Example 4, a usual Fabry-Perot type semiconductor laser device is used as a light source semiconductor laser for the optical memory reading apparatus, unlike the tunable semiconductor laser 12 used in Examples 1 and 2 and the wavelength-stabilized laser device 52 used in Example 3. The present invention can be applied to a case where a usual Fabry-Perot resonator type semiconductor laser with no special wavelength stabilizing function is utilized. As to the driving circuit, the specific description thereof is omitted, since it is the same as that in Example 3.

The Fabry-Perot type semiconductor laser device used in Example 4 has a requirement that, even if the injected current is modulated for converting the optical frequency so that the optical frequency modulation has a triangular or sawtooth waveform, the oscillation axial mode spectrum should be a single mode rather than a multi mode. The above requirement aims not to deteriorate the monochromaticity of the output laser light.

Also in Example 4, for the same reasons as described in Example 3, the modulation frequency of the current injected into the semiconductor laser is preferably lower than the read rate of the recorded information. At the highest, it is about 1 MHz.

As is shown in FIG. 6, it is necessary that the modulation current having a triangular waveform be always larger than the threshold current for the oscillation of the semiconductor laser. If the modulation current becomes smaller than the threshold current of the semiconductor laser even temporarily (i.e., the threshold current is interrupted), the laser oscillation temporarily stops and the information read cannot be performed continuously. This condition is also applied to Example 3.

As described above, when the modulation is performed at a relatively lower frequency, and the modulation current has a waveform which continuously varies without an interruption of the threshold current of the semiconductor laser, the oscillation axial mode does not become a multi mode.

Therefore, according to Example 4, a usual single axial mode semiconductor laser is used, and the range of the current modulation width is set so as to sufficiently ensure the single axial mode (i.e., the range having the side mode suppression ratio of the oscillation axial mode of 20 or more), whereby the above requirement can be satisfied.

The semiconductor laser device used in Example 4 was a Fabry-Perot type semiconductor laser device. Specifically, in the Fabry-Perot type semiconductor laser device, the range of the power level of output laser light is from 1 mW to 10 mW, and a side mode suppression ratio of 30 db or more is ensured. The front and rear faces of the resonator are both coated to have a high reflectivity. Such Fabry-Perot type semiconductor laser device is described in detail in S. Matui et al., Applied Optics, Vol. 23, pp. 4001–4006 (1984).

In Example 4 the same as in Example 3, the optical frequency of oscillation of the Fabry-Perot type semiconductor laser device is modulated so as to satisfy the condition of Expression (1), whereby the feedback light noise can sufficiently be suppressed by utilizing the laser light with a superior monochromaticity (i.e., having the time-averaged spectral line width of the laser light of 1 nm or less).

The application of the present invention is not limited to those described in the above examples. If the present invention is applied to the following cases, they can attain the same effects.

(1) A case where, as a semiconductor laser device, for example, a semiconductor laser of InGaAlP material type and having a wavelength of 670 nm is used, or a case where, as a semiconductor laser device, a semiconductor laser device of group II-VI compounds and having an oscillation wavelength of about 450 nm is used. (2) A case where the driving conditions, i.e., modulation frequency, modulation width and the like are different from those in the above examples.

(3) A case where the construction of the optical pickup and the time period $\tau$ from the emitting to the return of the feedback light are different from those in the above examples.

As described above, the semiconductor laser driving method for an optical memory reading apparatus of the invention has advantages that the semiconductor laser device can be driven by an electronic circuit which can easily and inexpensively be produced without using a high frequency signal, and that the feedback light noise can surely be suppressed.

Moreover, it is possible to hold the oscillation axial mode of the semiconductor laser device as a light source to be a single mode, so that the obtained laser light is superior in monochromaticity. Therefore, the device of the present invention has an advantage that it can be applied to a micro optical pickup which utilizes the light diffraction phenomenon by a hologram, a grating or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for optically reading recorded information by radiating laser light emitted from a semiconductor laser which oscillates in a single longitudinal mode to an information recording medium and by detecting laser light reflected from a recording face of the information recording medium, wherein the optical frequency of the laser light is modulated in order that the modulated optical frequency is a periodic function dependent on time, and wherein the absolute value of a time differential coefficient R (Hz/s) of the periodic function, a spectral line width $\delta \nu$ (Hz) of the laser light, and a time period $\tau$ (s) from the time when the laser light is emitted to the time when the laser light reflected from the recording face of the information recording medium reaches the semiconductor laser satisfy the condition of $R \geq \delta \nu/\tau$.

2. A method for optically reading recorded information according to claim 1, wherein the periodic function varies to have a sawtooth waveform.

3. A method for optically reading recorded information according to claim 1, wherein the periodic function varies to have a triangular waveform.

4. A method for optically reading recorded information according to claim 1, wherein the modulation of the optical frequency and the output level of the laser light are independently controlled.

5. A method for optically reading recorded information according to claim 1, the modulation frequency of the optical frequency is set to be lower than the signal frequency band of an information read signal which is the laser light reflected from the recording face of the information recording medium.

6. A method for optically reading recorded information according to claim 1, wherein the optical frequency of the semiconductor laser is modulated by modulating a current applied to the semiconductor laser.

7. A method for optically reading recorded information according to claim 4, wherein the output level of the laser light is kept constant during modulation of the optical frequency of the laser light.

8. A method for optically reading recorded information according to claim 1, wherein $\delta \nu$ is in a range of 10 to 50 MHz.

9. A method for optically reading recorded information according to claim 1, wherein the output of the laser light is not turned off during a reading period.

10. A driving device for a semiconductor laser used in an apparatus for optically reading information by laser light which is emitted from the semiconductor laser which oscillates in a single longitudinal mode to an information recording medium and by detecting laser light reflected from a recording face of the recording medium, the driving device comprising: modulating means for modulating an optical frequency of the laser light so that the optical frequency varies as a period function dependent on time, wherein the absolute value of a time differential coefficient R (Hz/s) of the periodic function, a spectral line width $\delta \nu$ (Hz) of the laser light, and a time period $\tau$ (s) from the time when the laser light is emitted to the time when the laser light reflected from the recording face of the information recording medium reaches the semiconductor laser satisfies the condition of $R \geq \delta \nu/\tau$.

11. A driving device for a semiconductor laser according to claim 10, wherein the modulating means includes means for modulating a current applied to the semiconductor laser so as to modulate the optical frequency of the laser light.

12. A driving device for a semiconductor laser according to claim 11, wherein the periodic function varies to have a sawtooth waveform.

13. A driving device for a semiconductor laser according to claim 11, wherein the periodic function varies to have a triangular waveform.

14. A driving device for a semiconductor laser according to claim 11, wherein the modulating means controls the optical frequency and the output level of the laser light independently.

15. A driving device for a semiconductor laser according to claim 14, wherein the modulating means modulates the optical frequency of the laser light so that the output level of the laser light is kept constant during modulating.

16. A driving device for a semiconductor laser according to claim 11, wherein the modulating means sets the modulation frequency of the optical frequency to be lower than the signal frequency band of an information read signal which is the laser light reflected from the recording face of the information recording medium.

17. A driving device for a semiconductor laser according to claim 11, wherein $\delta \nu$ is in a range of 10 to 50 MHz.

18. A driving device for a semiconductor laser according to claim 11, wherein the modulating means modulates the optical frequency of the laser light without turning off the output of the laser light during a period for reading the information.

* * * * *